United States Patent [19]

Takei et al.

[11] Patent Number: 4,640,700

[45] Date of Patent: Feb. 3, 1987

[54] METHOD FOR ATTACHING A STUD PIN TO A CATHODE RAY TUBE PANEL

[75] Inventors: Shinzo Takei, Tokyo; Junji Yokoyama, Kanagawa; Makoto Takagi, Tokyo, all of Japan

[73] Assignee: Sony Corporation, Tokyo, Japan

[21] Appl. No.: 751,428

[22] Filed: Jul. 3, 1985

[30] Foreign Application Priority Data

Jul. 4, 1984 [JP] Japan ................... 59-138789

[51] Int. Cl.$^4$ .............................................. C03C 27/02
[52] U.S. Cl. ........................................ 65/59.22; 65/43
[58] Field of Search ............... 65/43, 59.21, 59.22, 65/59.28, 59.6

[56] References Cited

U.S. PATENT DOCUMENTS

| | | | |
|---|---|---|---|
| 3,446,695 | 5/1969 | Rao | 65/43 X |
| 3,623,855 | 11/1971 | Boon | 65/59.22 X |
| 3,917,490 | 11/1975 | Brown et al. | 65/43 X |
| 4,057,409 | 11/1977 | Alexandrovich et al. | 65/59.28 X |

FOREIGN PATENT DOCUMENTS 1418663 of 1886 United Kingdom ............ 65/43

*Primary Examiner*—Robert Lindsay
*Attorney, Agent, or Firm*—Hill, Van Santen, Steadman & Simpson

[57] ABSTRACT

A method for attaching a stud pin to a cathode ray tube panel is disclosed, which employs as a frit slurry to attach the stud pin to the cathode ray tube panel, a crystalizing solder glass, a binder and a solvent having a viscosity higher than 10 cps and a boiling point ranging from 200° C. to 320° C.

3 Claims, 3 Drawing Figures

METHOD FOR ATTACHING A STUD PIN TO A CATHODE RAY TUBE PANEL

BACKGROUND OF THE INVENTION

1. Field of the Invention

This invention relates generally to a method for attaching a stud pin to a cathode ray tube panel and more particularly, is directed to improvements of the frit slurry used for attaching the stud pin to the cathode ray tube panel.

2. Description of the Prior Art

In a cathode ray tube of a color television receiver, as shown in FIG. 1, a color selecting electrode 1 such as an aperture grille, a shadow mask and so on is attached through a leaf spring 2 provided on the color selecting electrode 1 to a cathode ray tube panel 3. More specifically, an aperture (not shown) formed through the leaf spring 2 is engaged with a stud pin 4 with a frustconical shape made of metal or ceramics and attached to the inner surface of the cathode ray tube panel 3 to thereby support the color selecting electrode 1 at a predetermined position. The color selecting electrode 1 shown in FIG. 1 is the aperture grille. In this case, the stud pin 4 is attached to the inner surface of the cathode ray tube panel 3 by using a frit slurry as a bonding agent.

As a prior art method for attaching the stud pin 4 to the cathode ray tube panel 3 by using the frit slurry, there has been proposed such a method as disclosed in the published document of, for example, Japanese patent application examined No. 33651/1983, in which the stud pin 4 having deposited thereon a glassy state solder glass or frit slurry 5 is accurately positioned relative to the inner surface of the cathode ray tube panel 3 by using a jig and then it is fixed to the cathode ray tube panel 3 by a clip (setting jig), it is subjected to the heating treatment to crystalize the frit slurry 5, thus the stud pin 4 being fixed to the cathode ray tube panel 3 at its predetermined position. In the case of this attaching method, considering the amount of the frit slurry 5 protruded around the stud pin 4, it is necessary to select the thickness of the frit slurry 5 before being subject to the heating treatment to be more than 10 times the thickness after being fixed. Since the frit slurry 5 is so thick as set forth just above, there is a problem that as shown in FIG. 2, during the heating treatment for recrystalizing the frit slurry 5, the stud pin 4 is sunk and moved by the elastic force of the clip or jig whereby after the stud pin 4 is fixed to the cathode ray tube panel 3, the positioning accuracy of the stud pin 4 provided before the heating treatment can not be maintained. This problem becomes serious particularly when producing a cathode ray tube of high definition.

As a method of attaching the stud pin 4 to the cathode ray tube panel 3 which can solve the above-mentioned problem, there has been proposed a method as disclosed in the published document of Japanese patent application examined No. 9020/1979, in which before the solvent contained in the frit slurry 5 is evaporated, the stud pin 4 is positioned relative to the panel 3 and then ultrasonic waves and so on are applied to the frit slurry 5 to thereby attach the stud pin 4 to the panel 3. Generally, as the frit material, a special crystalizing solder glass having a low melting point and whose specific gravity is as heavy as 6.1, for example, Pyroceram cement (product name) is used. Since this crystalizing solder glass contains lead oxide with a mixed amount of about 75% in total amount, it is not possible to use a binder and a solvent which will make a reducing atmosphere when they are heated and baked. For this reason, as the solvent therefor, there is used, for example, isopropyl alcohol (boiling point is 82.4° C.) of quick drying property. As a result, the attaching work must be carried out skillfully and hence the workability thereof becomes poor, resulting from problems in a mass-productivity and automation standpoint.

OBJECTS AND SUMMARY OF THE INVENTION

It is an object of this invention to provide a method for attaching a stud pin to a cathode ray tube panel which can improve the accuracy in attaching the stud pin to the cathode ray tube panel.

It is another object of this invention to provide a method for attaching a stud pin to a cathode ray tube panel which can increase the workability in attaching the stud pin to the cathode ray tube panel.

According to one aspect of the present invention, there is provided a method for attaching a stud pin to a cathode ray tube panel using a frit slurry which consists of a crystalizing solder glass, a binder and a solvent, characterized in that said solvent has a visocity of higher than 10 cps and a boiling point ranging from 200° C. to 320° C.

These and other objects, features and advantages of the present invention will become apparent from the following detailed description of the preferred embodiment taken in conjunction with the accompanying drawings, throughout which like reference numerals designate like elements and parts.

DESCRIPTION OF THE PREFERRED EMBODIMENT

Figure 1:
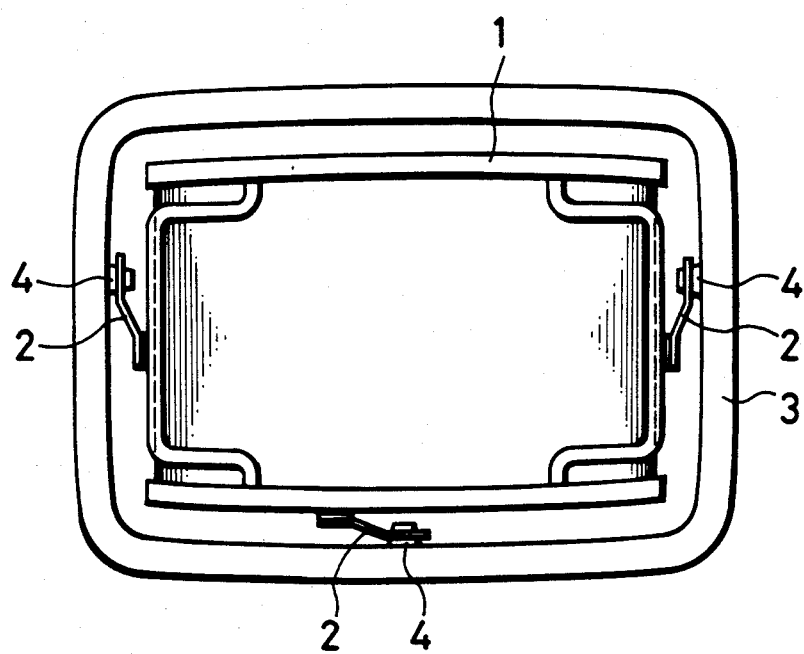
FIG. 1 is a plan view useful for explaining a cathode ray tube panel of a television receiver.
Figure 2:
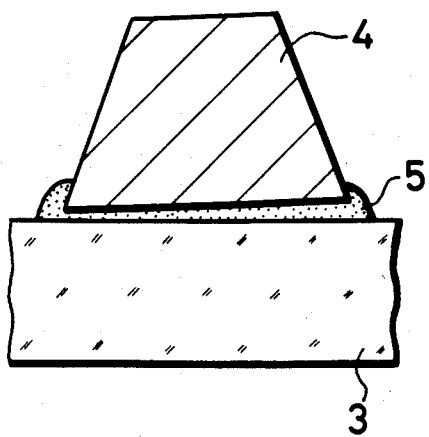
FIG. 2 is a cross-sectional view showing a state that a prior art stud pin is attached to the inner surface of the cathode ray tube panel.

Now, the present invention will hereinafter be described with reference to the drawing.

In the present invention, as the solvent in the frit slurry, there is used a substance having a viscosity higher than 10 cps and a boiling temperature ranging from 200° C. to 320° C., for example, 2,2, 4-trimethyl 1,3-pentanediol monoisobutyrate (expressed by the following constitutional formula and having a viscosity of 12 cps and boiling point of 248° C.) which is the hydroxy ester of, for example, 2,2,4-trimethyl 1,3-pentanediol, an ester alcohol such as 2,2,4-trimethyl 1,3-pentanediol dibutyrate (viscosity is 11 cps and boiling point is 280° C.), dibutyl tartrate (viscosity is 10.59 cps and boiling point is 312° C.) and so on. The essential condition of viscosity is to increase the viscosity of the frit slurry and to give proper fluidity thereto to thereby improve the workability. As the essential condition of the boiling point, the reason why it is selected to be higher than 200° C. is that if the boiling point is lower than 200° C., the solvent is evaporated so rapidly that the frit slurry is given quick drying property, while the reason why the boiling point is selected to be lower than 320° C. is that since the glass transition point of the crystalizing solder glass (frit slurry) is 320° C., the solvent must be evaporated at temperature lower than 320° C.

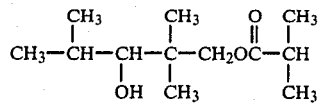

(2,2,4-trimethyl 1,3-pentanediol monoisobutyrate)

As the crystalizing solder glass and the binder, there can be used ordinary ones.

Now, an embodiment of the frit slurry of the invention containing the above-described compositions will be described.

| | |
|---|---|
| 2,2,4-trimethyl 1,3-pentanediol monoisobutyrate | 100 g |
| nitrocellulose (binder) | 1.8 g |
| crystalizing solder glass (product name is ASF-1307, manufactured by Asahi Glass Co., Ltd.) | 1 Kg |

Figure 3:
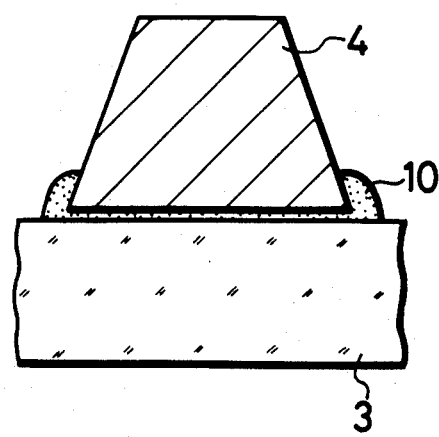
FIG. 3 is a cross-sectional view showing a state that a stud pin is attached to an inner surface of a cathode ray tube panel by using a frit slurry according to an embodiment of a method of the present invention.

In the present invention, as shown in FIG. 3, such a frit slurry 10 with the compositions, for example, just mentioned above is coated on the stud pin 4 to have a predetermined thickness and then the stud pin 4 is located at the predetermined position relative to the panel 3. Then, the stud pin 4 is pressed against the inner surface of the panel 3 through a setting jig (not shown). At this time, the frit slurry 10 is crushed to have a predetermined thickness and the extra or protruded frit slurry 10 surrounds the lower portion of the stud pin 4.

When the stud pin is attached to the inner surface of the cathode ray tube panel by the use of the frit slurry according to the present invention, the frit slurry is given a slow drying property and the viscosity of the mixture made of the binder and the solvent is increased from several tens cps of the prior art to 1000 to 3000 cps so that even if the crystalizing solder glass having large specific gravity is mixed thereto, the sedimentation of frit is not caused, thus improving the workability considerably. For example, when the prior art frit slurry is used, the attaching work of the stud pin to the panel must be carried out within a period from one to one and a half minutes. On the other hand, if the frit slurry of the present invention is used, even in two or three days after the frit slurry was coated on the stud pin, the attaching work thereof can be carried out. As a result, it becomes possible to coat the frit slurry on a large number of the stud pins in advance and to keep them as they are. Accordingly, it is possible that a number of the stud pins are placed on a plane of a cassette and they are coated with the frit slurry by a dispenser, a screen printing and the like, then the stud pins are taken up one by one at necessary time and then attached to the panel. Thus the attaching work can be automated easily. Further, when the stud pin is fixed to the inner surface of the panel by the setting jig, the frit slurry is not yet dried and hence has a proper fluidity so that the thickness of the frit slurry on the coated surface is less than 100 μm which is substantially the same as the thickness of the frit slurry after the stud pin is finally attached. Accordingly, unlike the prior art, the stud pin can be prevented from being sunk and moved by the softening of frit slurry when the heating treatment is carried out for the frit slurry so that the stud pin can be attached to the inner surface of the cathode ray tube panel accurately.

Furthermore, since the frit slurry is high in viscosity, it is possible to prevent the frit (powder) from being scattered during the period in which the stud pin is fixed.

As set forth above, according to the present invention since the thickness of the frit slurry when the stud pin coated with the frit slurry is accurately positioned relative to the panel by the setting jig can be maintained even after the stud pin is fixed to the panel finally, the frit slurry layer having a desired thickness can be formed on the stud pin with good reproducibility, thus avoiding the attaching accuracy of the stud pin from being dispersed.

Furthermore, since the frit slurry of the invention is very slow in drying property as compared with the prior art one, the workability can be improved.

The above description is given on a single preferred embodiment of the invention, but it will be apparent that many modifications and variations could be effected by one skilled in the art without departing from the spirits or scope of the novel concepts of the invention, so that the scope of the invention should be determined by the appended claims only.

We claim as our invention:

1. A method for attaching a stud pin to an inside wall portion of a cathode ray tube panel using a frit slurry which consists of a crystalizing solder glass containing lead oxide, a binder comprising nitrocellulose and a solvent, characterized in that said solvent is an ester alcohol having a viscosity of higher than 10 cps and a boiling point ranging from 200° C. to 320° C., whereby said slurry has a slow drying property and high viscosity.

2. The method as claimed in claim 1, in which said solvent is one selected from the group consisting of 2,2,4-trimethyl 1,3-pentanediol monoisobutyrate, 2,2,4-trimethyl 1,3-pentanediol dibutyrate, and dibutyl tartrate.

3. The method as claimed in claim 1, in which said frit slurry contains as its composition 100 parts of 2,2,4-trimethyl 1,3-pentanediol monoisobutyrate, 1.8 parts of nitrocellulose and 100 parts of a crystalizing solder glass.

* * * * *